US008595660B2

(12) United States Patent  
Newcomb et al.

(10) Patent No.: US 8,595,660 B2  
(45) Date of Patent: Nov. 26, 2013

(54) METHOD AND SYSTEM OF AUTOMATICALLY IDENTIFYING LEVEL SHIFTER CIRCUITS

(76) Inventors: Jesse Conrad Newcomb, Daly City, CA (US); Govinda Keshavdas, Santa Clara, CA (US)

( * ) Notice: Subject to any disclaimer, the term of this patent is extended or adjusted under 35 U.S.C. 154(b) by 0 days.

(21) Appl. No.: 13/483,585

(22) Filed: May 30, 2012

(65) Prior Publication Data

US 2012/0266122 A1  Oct. 18, 2012

Related U.S. Application Data

(63) Continuation-in-part of application No. 13/401,704, filed on Feb. 21, 2012, which is a continuation-in-part of application No. 13/451,530, filed on Apr. 19, 2012.

(60) Provisional application No. 61/543,395, filed on Oct. 5, 2011, provisional application No. 61/476,320, filed on Apr. 17, 2011.

(51) Int. Cl.  
*G06F 17/50* (2006.01)

(52) U.S. Cl.  
USPC ............ 716/109; 716/101; 716/106; 716/136

(58) Field of Classification Search  
USPC .......................... 716/100, 101, 106, 109, 136  
See application file for complete search history.

(56) References Cited

U.S. PATENT DOCUMENTS

| 5,537,328 A * | 7/1996 | Ito ................................. 716/120 |
| 8,225,251 B2 * | 7/2012 | Newcomb ..................... 716/106 |
| 2012/0151427 A1* | 6/2012 | Newcomb ..................... 716/109 |
| 2012/0266121 A1* | 10/2012 | Newcomb ..................... 716/109 |

\* cited by examiner

*Primary Examiner* — Sun Lin  
(74) *Attorney, Agent, or Firm* — Stephen Zweig (57) ABSTRACT

A logical and topological based software method of detecting level shifter circuits in complex integrated circuit designs. The method, which identifies level shifters by various design rules such as suitably connected PFET and NFET pairs in various circuit contexts, rather than prior art simulation methods, can identify and mark various devices and circuits as being part of a level shifter, and also place the identified level shifters within the context of the integrated circuit chip's various power domains. In some embodiments, the method, working with little or no a-priori information other than the integrated circuit's netlist computer file, can automatically trace power and signal lines, automatically determine power domains, and automatically flag when signal lines between different power domains are not adequately protected by level shifters.

22 Claims, 6 Drawing Sheets

METHOD AND SYSTEM OF AUTOMATICALLY IDENTIFYING LEVEL SHIFTER CIRCUITS

CROSS REFERENCE TO RELATED APPLICATIONS

This invention is a continuation in part of U.S. patent application Ser. No. 13/401,704 entitled "AUTOMATED IDENTIFICATION OF POWER AND GROUND NETS IN AN INTEGRATED CIRCUIT NETLIST", inventor Jesse Conrad Newcomb, filed Feb. 21, 2012; this application is also a continuation in part of U.S. patent application Ser. No. 13/451,530, "METHOD TO DETERMINE HIGH LEVEL POWER DISTRIBUTION AND INTERFACE PROBLEMS IN COMPLEX INTEGRATED CIRCUITS", inventor Jesse Conrad Newcomb, filed Apr. 19, 2012; this application also claims the priority benefit of provisional patent application 61/543,395, "Analyzer of Electronic Circuits", Inventor Jesse Conrad Newcomb, filed Oct. 5, 2011; both application Ser. No. 13/401,704 and application Ser. No. 13/451,530 claimed the priority benefit of provisional application 61/476,320, "Analysis of Electronic Circuits", Inventor Jesse Conrad Newcomb", filed Apr. 17, 2011; the contents of all of these applications are included herein by reference.

BACKGROUND OF THE INVENTION

1. Field of the Invention

This invention is in the field of automated (e.g. computer assisted) integrated circuit chip design, simulation, and analysis tools.

2. Description of the Related Art

Modern integrated circuit chips are extremely complex devices, which may have millions of different electronic components (devices), such as NFET and PFETs, switches, and the like. These circuits, which are usually designed by teams of engineers using various circuit description languages (e.g. Berkeley SPICE, CDL (Circuit Description Language), Spectre™, LVS (Layout vs. Schematic) and the like). The circuits will typically comprise millions of individual devices and nets, and will often be powered by multiple power supplies (e.g. higher voltage, lower voltage, noisy, quiet, low current, higher current), as well. The chips are often so complicated that they far exceed the ability of the human designer's minds to fully understand, absent various computer assisted analytical tools.

Typically, integrated circuits are usually designed by using software tools to combine computer representations of various smaller blocks of circuits into computer representations of larger blocks of circuits, and then using other computer tools to connect the blocks through various Input/output (IO) interfaces and power connections. Each block has its own netlist and various devices, and these various smaller building blocks can be grouped into larger and larger circuit blocks, in a manner somewhat reminiscent of using image editors or CAD programs to construct final graphic images by combining various layers of sub-images.

Each block will generally have its own function, internal netlist, and power supply needs. As the various smaller or child blocks or sub-blocks are assembled into larger and larger parental blocks, the larger blocks can be viewed as created from a plurality of sub-blocks that are nested within the larger block. This block and nested sub-block type layered structure can often go on for many layers or nesting levels, until a final lowest "leaf" level is reached.

Thus the computer design tools used to design these chips typically store libraries of various standardized and debugged circuit blocks in memory. The various design engineers, during at least some phases of the circuit design process, select various blocks from design libraries. They then use their various computer design tools connect the various signal and power interfaces between these various blocks to form more complex designs.

For example, a large integrated circuit chip with perhaps 10 million devices or nets may have been built from 2000 circuit cells or larger assemblies of circuit blocks, many of which will be taken from the design library. As a result of this typical "pick circuit blocks from the library and place on the chip" type design process, the overall circuit netlist is organized as a series of blocks in a layered, branched, or nested hierarchy pattern. Some branches of this nested block hierarchy may be quite deep, while other branches may be quite shallow.

Thus at a high level, the overall circuit structure or netlist can be viewed as a being composed of major circuit domains, each with its own type of power supply. The various circuit domains in turn are composed of a hierarchy of nested blocks, with various signal and power interfaces between these various blocks.

Given the overall complexity of typical modern integrated circuits, it is inevitable that there will be many different types of design errors. Thus a large part of circuit design is focused on detecting and correcting these design errors.

Because different circuit blocks can have different power supply requirements, one common type of design error is an error where the power distribution scheme within a larger integrated circuit is inadequate to support the various power needs of the various circuit blocks and sub-blocks. Often this power distribution inadequacy may not be apparent at the highest level bocks, but rather is a problem that occurs lower in the hierarchy of nested lower level blocks.

Another type of power related design error is one in which the electrical signal interfaces or signal lines (IO interfaces) between different blocks with different power supplies are inadequate to cope with problems caused by these different power supplies. For example, some blocks may be supplied by lower voltage power supplies, and their interfaces to other blocks, which may be supplied by higher voltage power supplies, must be adequately protected to properly convey the signal and to prevent circuit damage. As another example, some blocks may be supplied by noisy power supplies that with greater power fluctuations, their signal interfaces to other blocks, that are less tolerant to noise, and thus are served with lower noise power supplies, must also be adequate.

Level shifters are often used to prevent communication problems between circuit domains supplied by different power sources. Level shifters are a type of electrical circuit protection cell that converts a digital signal, operating at one voltage range to a matching signal operating at a different voltage range. As portable battery-operated devices (e.g. cell phones, multi-media players) with complex integrated circuit chips have become more common, circuits with mixed power supplies have also become more common, and thus the appropriate use of level shifters has become more and more critical in modern integrated circuit design.

Level shifters essentially convert digital signals adapted for a first set of electronic circuits configured for a first set of voltages into equivalent digital signals adapted for a second set of electronic circuits configured for a second set of voltages. In some cases, level shifters might, for example, convert digital signals from a first set of circuits designed for 1.2 volt signals to a second set of circuits designed for 3.3 volt signaling.

Although various computer analytical software tools, exemplified by the Cadence Spectre tool and the Synopsis HSIM tool, are available to trace various power related design flaws, such tools generally are focused a very detailed level of circuit design and simulation. As a result, such prior art tools fail to "see the forest for the trees" in that rather than reporting the root cause analysis of problems (e.g. the "crime suspect"), instead they tend to predict circuit behavior instead. This tends to bury any important information in a sea of irrelevant results, and makes proper corrective action difficult.

To detect designs that are flawed due to absent or inappropriate level shifters between different circuits in different power domains, such prior art circuit analysis techniques generally used circuit simulation methods. As will be discussed in more detail in this specification, however, such simulation methods are far from perfect, however, and in fact can often fail to detect level shifter design problems.

Thus, as previously discussed in copending parent application Ser. Nos. 13/401,704 and 13/451,530, the contents of which are incorporated herein by reference, further improvements in computer software tools to automatically detect and report high level problems in circuit design would be useful. In particular, methods to better detect problems caused by inadequate power distribution schemes, and inadequate protection of signal interfaces from power related issues (such as can be caused by lack of appropriate level shifters) would be useful.

BRIEF SUMMARY OF THE INVENTION

The invention is based, in part, on the insight that prior art circuit simulation methods of detecting level shifter problems mainly function when signals between two different circuit power domains of greatly differing voltage or current levels are analyzed. When voltage (or current) differences are very great, (e.g. when a low voltage logical signal is used to directly drive a device designed for much higher voltage logical signals), then prior art circuit simulation methods have a much greater chance of detecting a problem. However with modern mixed power supply integrated circuits, often the voltage differences between different power domains are relatively small (e.g. there may be 1 volt power domains, 1.2 volt power domains, 1.5 volt power domains, and so on), such prior art circuit simulation methods often fail to detect problems.

Consider, for example, a first case where the level shifter converts from a first set of circuits designed for 1.2 volt signals to a second set of circuits designed for 3.3 volt signaling. Here, because a level shifter is designed to provide isolation and conversion between different power domains with a chip, the absence of appropriate level shifters can cause complete digital signal transfer failure, and thus would be more likely to be detected by prior art simulation techniques.

By contrast, consider a second case where the two different circuit power domains, although still operating at different voltage levels, have less dramatic voltage level differences.

Here it is not always certain that design errors will be detected by simulation. Although here again, a level shifter is designed to provide isolation and conversion between different power domains with a chip, the failure incorporate a level shifter in the second case design is not nearly as dramatic as it is in the 1.2 to 3.3 volt first case above.

When the two different power domains have smaller voltage differences, then even without the level shifter's isolation or conversion, the circuit may still function properly, at least in various computer mathematical simulations (thus avoiding failure by a "close call"). For example: A 1.2 v signal can, at least according to many mathematical models be driven into a 1.0 v destination or receiver device. However, in the real world, for reliable operation a level shifter should be used.

If, in this second case, the level shifter is omitted (by mistake) in the design, then this particular design error may not be detected because prior art mathematical simulation methods will still report that in computer simulations, this part of the circuit gives adequate performance. However, in the real world, once this circuit has been implemented in actual silicon (e.g. a manufactured end product), then due to more complex real world effects (e.g. leakage currents, slow device degradation, and other effects that mathematical simulation methods do not predict well), then the end chip will not perform adequately. This results in much wasted time, effort, and expense.

The invention is also based, in part, on the further insight that to avoid this type of problem, circuits such as level shifters, and the places where such level shifters should be used in a complex integrated circuit design, should best be checked by computerized logical and topological methods, rather than by "brute force" prior art circuit simulation methods. Such logical and topological methods are not easy to implement, however. This is because from a circuit topology standpoint, there are many different types of level shifter designs, and thus it is difficult, using logical and circuit topology methods, to always detect exactly what circuit cells, nets, or devices actually form a level shifter, and which do not.

The problem becomes still more complex because modern integrated circuit chips, such as cell phone processor chips, may have 10 or more distinct level shifter designs. The chip designer may in turn have chosen these 10 or more level shifters from a much larger level shifter design library which may hold over 100 other alternative level shifter designs. Given differences in design libraries, and often inadequate documentation, it thus becomes very cumbersome for users of automated integrated circuit chip design inspection tools to provide a list of such alternative level shifter designs by name and function.

To overcome this problem, the invention instead relies on automated methods that automatically identify level shifters based upon knowledge (e.g. design rules) of the level shifter's essential structure and function.

Thus in some embodiments, the invention may be an automatic, computer implemented method of finding or detecting a level shifter circuit (usually within the context of a larger circuit such as a complex integrated circuit chip design), using logical and topological methods.

The method may further comprise subsequently identifying or marking the various devices or parts of the circuit that comprise the identified level shifter (e.g. marking a particular device with a flag such as "this transistor is part of a level shifter circuit"), so that the device can then be analyzed further in subsequent queries. The method may further comprise linking (in a computer database or other data handling structure) the various devices or parts that comprise the identified level shifter so that the level shifter circuit can then be referred to as a whole (e.g. "this transistor is part of level shifter made of transistors X, Y, Z").

Once identified by the invention's methods, in some embodiments, the identified level shifters may be further automatically placed within the context of the integrated circuit chip's various power domains, as per the methods of parent application Ser. No. 13/451,530, incorporated herein by reference. Indeed, using such methods, even graphical output showing the various relevant power domains, and the signal pathways between the various power domains that are or are not adequately protected by level shifters may be produced.

In these above applications, as will be discussed, in some embodiments it may be further useful to use the automated power rail detection methods of parent application Ser. No. 13/401,704, incorporated herein by reference.

DETAILED DESCRIPTION OF THE INVENTION

As used herein, and as consistent with standard nomenclature in the art, the term "Level shifter" is defined as an electrical circuit that converts a digital signal operating at one voltage to a matching signal operating at a different voltage.
Discussion of Integrated Circuit Chip Power Considerations As previously discussed, integrated circuits are almost always designed with a master or high-level map, scheme or plan for to handle the circuit's power distribution and protection needs. At present, this high level map, scheme or plan is often created by one or more top level design engineers. Because these plans are intended to be high level concepts produced for the benefit of other skilled human circuit designers to then implement, such designs tend to be informal. They often exist in the form of a drawing or sketch, rather than as an actual top level map generated by a computerized circuit design program.

Once these and other various top level maps and specifications are given to other members of the design team, generally the formal part of chip design then commences using various prior art software methods and tools to translate the top level design intent into more specific design files that guide the circuit design. As part of this process, generally ideally level shifters are used to protect the signal interfaces that pass between different regions of the chip that are powered by different types of power supplies.

Due to the complexity of the chips and design process, errors are inevitable, and much of the design process consists of using various software chip analysis tools to analyze and debug the prototype chip design netlist, which itself exists in the form of software files at this stage in the process. As previously discussed, various prior art software methods are used to debug these chip designs. These methods include the Insight EDA Analyzer software products. Typically these various analysis and debugging tools exist in the form of software programs, typically running on computer systems with at least one processor, memory, user interface (e.g. a GUI display screen and keyboard/mouse), as well as mass storage and network connectivity. The methods described herein are also software methods, and will also typically operate on such computer systems as well.

In some embodiments, the invention may be a computer implemented method or software product of automatically identifying level shifter circuits in the netlist specification of a complex integrated circuit chip comprising a plurality of nets.

In a first approach, this method will generally comprise representing the netlist in computer readable form, and using at least one computer processor, software, and memory to analyze these netlist nets. Generally, for each analyzed net, the method will determine at least one pair of directly cross-coupled PFET devices, and for each such one pair of directly cross-coupled PFET devices, perform the steps of:

1) Using the two netlist locations of the pairs of directly cross-coupled PFET devices as two PFET starting locations, the software will trace those nets that are coupled to each PFET device and that is also ultimately coupled to ground nets by way of intermediate NFET devices, thus determining two PFET to NFET to ground pathways (stacks).

2) The software will then determine if the two PFET to NFET to ground pathways (stacks) are also cross-coupled and parallel, as will be discussed in more detail shortly.

3) If the software determines that the two PFET to NFET to ground pathways (stacks) are also cross-coupled and parallel, then the software will further determine (e.g. conclude) that these two PFET devices and two PFET to NFET to ground pathways (stacks) are in fact parts of a level shifter, thus making a level shifter determination (using this first method).

4) The software will generally then store this level shifter determination in memory as a first level shifter determination, at least as reported using this first method.

As will be discussed, this first method may fail to detect level shifters in some circumstances, so that it is often useful to supplement this first method by an alternative second method that uses a different logical and topological approach to identify level shifters.

In an alternative second approach, the method again generally comprises representing the netlist in computer readable form, and again uses at least one computer processor, software, and memory to analyze these netlist nets. In this alternative second approach (which may be used either independently or also in conjunction with the first approach, and in any order—first method and then second method, or second method and then first method), the second method will further determine at least one pair of common inverter cross-coupled NFET devices that are also ultimately coupled to ground nets.

In this second method, for each such pair of common inverter cross-coupled PFET devices that are also ultimately coupled to ground nets, this alternative second approach will perform the steps of:

1) Using the two netlist locations of this pair of NFET devices as two NFET starting locations (e.g. one starting location per NFET in the pair), the software will trace those nets that are both coupled to each NFET device, and which are also ultimately coupled to power nets by way of intermediate PFET devices. In terms of the invention nomenclature, this step of the second method thus determines two NFET to PFET to power pathways or "stacks". The "stack" term is used because as will be discussed shortly, the invention's software may rely upon software stack data structure methods to keep track of these power pathways.

2) The software will then determine if the two NFET to PFET to power pathways (stacks) are also either directly, indirectly, or distantly cross-coupled and parallel, as again will be discussed in more detail shortly.

3) If the software finds that these two NFET to PFET to power pathways (stacks) are also either directly, indirectly, or distantly cross-coupled and parallel, then the software will determine (e.g. conclude) that the two NFET devices and two NFET to PFET to power pathways are a level shifter, thus making a level shifter determination according to the second method.

4) The software will then generally store this second method level shifter determination in memory as a second level shifter determination.

If a particular circuit structure is determined to be a level shifter by either the first or second method, then the system software will determine that this particular circuit structure is a level shifter. That is, often it will be useful to run both the first method and second method together, and if either method determines a circuit element to be a level shifter, then using the results of either method to determine that that circuit element is a level shifter or part of a level shifter. This way if the first method misses a level shifter, the second method may find it, and vice versa.

Although the invention may operate using previously specified power and ground pathway, nets, or rails, often this information may not be available. Here, however the invention may function even without such previously specified power and ground pathways, nets, or rails by using methods, such as the methods of parent application Ser. No. 13/401,704, incorporated herein by reference, to automatically determine the power and ground pathways from an integrated circuit netlist. Thus the present invention is capable of functioning even with limited or no a-priori information regarding a chip beyond the chip's computer readable netlist file.

Example of Automated Power and Ground Net Determination

To briefly summarize some of the automated power and ground net detection methods of parent application Ser. No. 13/401,704, such methods can include using at least one computer processor, software, and memory to analyze the nets from a computer readable netlist, and for each analyzed net, the software will:

A) Determine the electrical properties of each device or device terminal that is coupled to the analyzed net, and sort the electrical properties for each device or device terminal into a series of bins, thereby creating a mathematical description of the overall electrical properties of the various devices that are coupled to that analyzed net B) The software will then compare this mathematical description with at least one preset mathematical description of a power net or a ground net.

C) If this overall description falls within at least one preset mathematical description of a power net or a ground net, then the automated power or ground net software will at least provisionally determine that the analyzed net is a power net or a ground net. The software will then store this determination in memory for later use for the level shifter determination. Further refinements from U.S. patent application Ser. No. 13/401,704 may also be used, and again are incorporated herein by reference. Please see U.S. patent application Ser. No. 13/401,704 for more information on these methods.

Returning to the level shifter discussion, once a level shifter has been determined, the computer system can then use this level shifter determination to identify at least some of the PFET devices and NFET devices as components of a level shifter circuit. This can be directly reported, or used for other types of analysis schemes.

For example, the software may then further link at least some of the PFET devices and NFET devices together, and identify at least some of the linked PFET and NFET devices as components of a level shifter circuit, so that at least some of the PFET and NFET devices can then be identified as being part of the same level shifter circuit.

Determination of PFET Device Cross-Coupling

As previously discussed, at least some embodiments of the invention require that the system automatically determine at least one pair of directly cross-coupled PFET devices. In order to determine if there is cross-coupling between different PFET devices, the system software may first use the computer processor, software, and memory to create a plurality of PFET data structures, useful for doing this type of analysis.

Here, this plurality of PFET data structures may be configured to allow a unique PFET data structure to be assigned to each PFET device being analyzed. To do this, the various PFET to NFET to ground pathways may be represented as a software stack type data structure of PFET to NFET to ground nets. Further, the PFET to power net pathways may be represented as a stack of PFET to power nets.

Accordingly, the PFET data structures will comprise data fields for storing the PFET device identifier and gate net location, the stack of PFET to NFET to ground nets, and the stack of PFET to power nets. The computer system can then use these data structures to automatically determine cross-coupling between different PFET devices, as well as to recursively trace net connections outward from the various PFET devices.

Reducing Computational Loads

As might be expected, the various methods here, particularly when employed over a large integrated circuit chip with millions of devices, can be computationally intensive. To reduce the number of calculations required, various optional heuristics can be utilized to simplify and reduce the computational load. Here, for example, the analysis software may be programmed to focus or restrict the analysis to cases only involving those pairs of PFETs that the system also determines are both served by the same power supply. The analysis may optionally be further restricted by restricting the analysis to those pairs of PFETs that the software determines (e.g. from the circuit netlist) are of the of the same device type or model name. This later restriction often works because most commonly, the coupled PFETs in a level shifter are of the same device type and model name.

Combining Level Shifter Determinations with Automated Power Domain Analysis Methods Although the present invention's methods can give very useful results to integrated chip designers by simply determining and reporting the various level shifters in the circuit, in other embodiments, the invention's methods may work in synergy with the methods of parent application Ser. No. 13/451,530 to put its level shifter findings into a broader context.

As previously discussed in this specification, and as also discussed in U.S. patent application Ser. No. 13/451,530, the contents of which are incorporated herein by reference, often the netlist specification of the circuit of an integrated circuit chip further comprises a nested block hierarchy of various devices. Here the methods of Ser. No. 13/451,530 can be used to automatically analyze the circuit into its various power domains, often with little or no other a-prior information. The methods of the methods of the present invention can be further used to automatically check the signal pathways between these different power domains and in particular determine if these signal pathways are adequately protected by level shifters or not.

Review of Automated Power Domain Methods

To briefly review the methods of parent U.S. patent application Ser. No. 13/451,530, for automated power domain analysis, the system software may again use at least one processor and software to determine which nets are power supply nets, and determine the connectivity of these power supply nets to different types of power supplies (as per parent application Ser. No. 13/401,704 previously discussed). The power domain analysis software can then automatically traverse the nested block hierarchy structure of the circuit netlist, ascending and descending in the nested block hierarchy, and it automatically determines if each examined block has adequate power coverage.

When supplemented by the additional level shifter detection methods disclosed in the present specification, the power domain software can further use the present application's level shifter detection methods to also automatically determine if any of the interfaces to other blocks are problematic due to the lack of an appropriate level shifter in the signal lines between domains.

Figure 6:
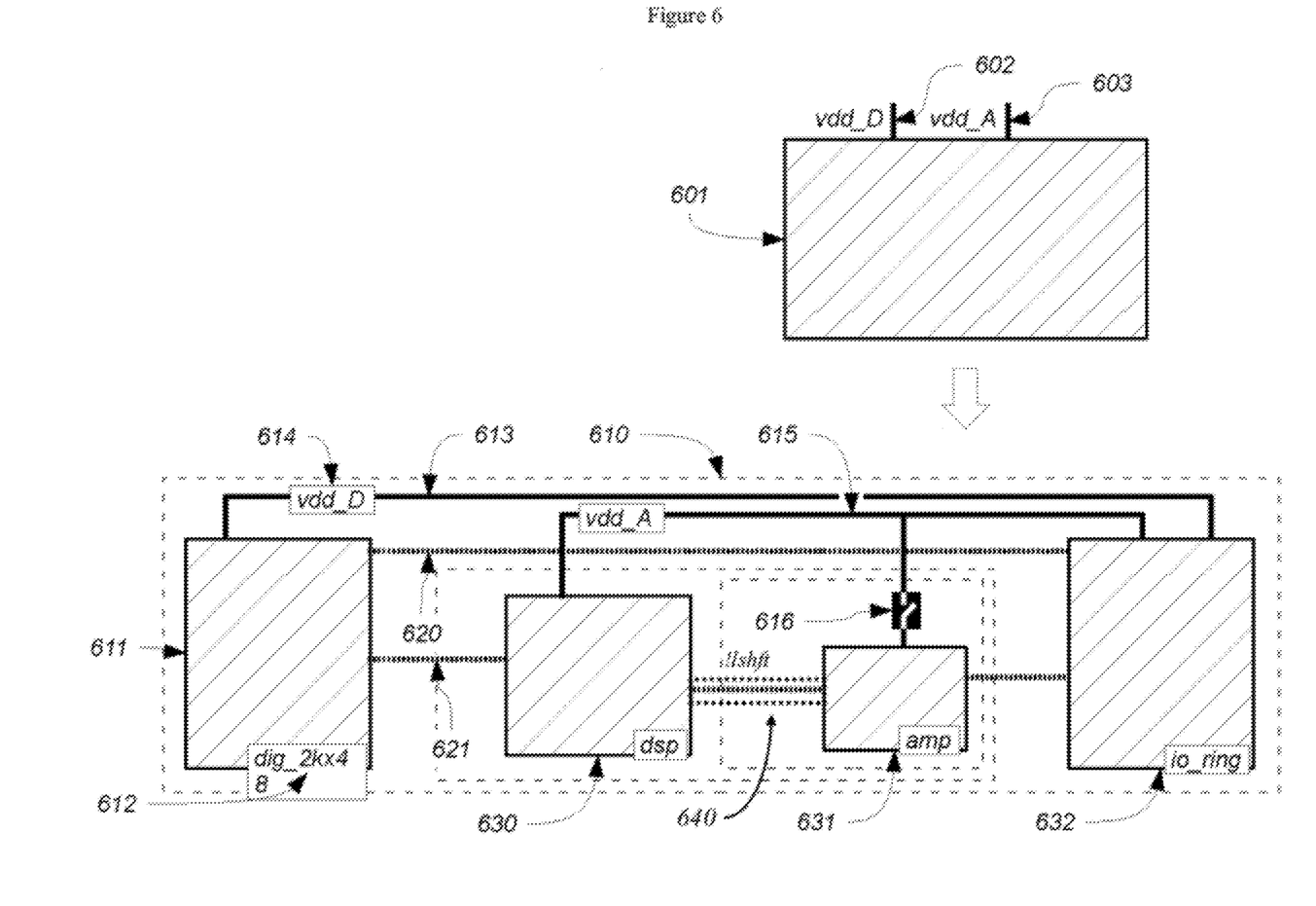
FIG. 6 shows an example of how the invention's methods can locate level shifters (or flag needed but missing level shifters) within a high level diagram that shows the signal pathways and other major relationships between the various chip power domains on an integrated circuit chip design.

This determination can be reported, for example, in the form of graphical output that shows the presence or absence of level shifters between different power domains, as is shown in FIG. 6.

Thus, particularly when the methods of Ser. Nos. 13/401,704, 13/451,530, and the present disclosure are combined in a unified software package, this type of analysis can be used in an automated software tool that can independently analyze the power relationships in a complex integrated circuit chip, and generate high level reports, ideally understandable to the original high level circuit designer. These reports can provide feedback on the circuit's high level power management problems in a manner that allows easy comparison to the circuit's original high level power management scheme. Ideally, for example, the report enables a high level chip designer to look at the analysis, and realize that the original high level power management scheme was defective because of a lack of an inadequately rated power switch (per the teaching of Ser. No. 13/451,530), or because the original power high level power management scheme lacked one or more level shifter in the signal pathways between two domains served by different power supplies. The net savings in time, effort, and cost can thus be very significant.

Summary of the Two Basic Level Shifter Detection Methods:

Thus to summarize, the invention may operate by one of two different methods. At a high level, these two methods may be described as level shifter PFET oriented, or level shifter NFET oriented.

First, PFET Oriented, Level Shifter Detection Method—Use Software to:

1: Find a first circuit starting point (aka "seed"), which is a pair of directly cross coupled PFET devices to start the analysis, and from there direct the analysis to proceed outward (e.g. grow outward).

2: Next grow (e.g. trace) the circuit from the PFET locations, "downward" (e.g. in the direction of the ground) through the parallel stacks of devices connected to the PFETs, to the ground nets. Here the ground nets may be determined according to the methods of parent patent application Ser. No. 13/401,704, as discussed previously.

3: If the analysis confirms that the downward analysis does reach a ground net from the PFETs through symmetric stacks of devices (e.g. two parallel and cross-coupled stacks of devices), and then report this circuit to be a level shifter circuit.

Here the main weakness of the first PFET oriented approach that this type of level shifter determination requires that the software find cross-coupling between the PFET devices through fairly direct ties or circuit nets. If such cross-coupling cannot be determined, then the first method could potentially fail to report an otherwise valid level shifter.

Second, NFET Oriented, Level Shifter Detection Method—Use Software to:

1: Find a second circuit starting point (aka "seed") which is a pair of ground connected NFET devices, with gates connected through a common inverter circuit.

2: Next grow (e.g. trace) the circuit upward (e.g. towards the power rail or nets) from these NFETs, through the two parallel stacks, through the PFETs, to power the power net or rail. Here as before, the power nets may be determined according to the methods of parent patent application Ser. No. 13/401,704, as discussed previously.

3: Compare the two different growth paths (e.g. traces) for symmetry.

4: Determine if there is cross-coupling between the growth paths. This cross-coupling may be indirect or distant, but if found, then also report this circuit as a level shifter circuit.

Here, as previously discussed, this second NFET oriented method does not have the same weakness as the first approach, but has its own weakness in that to detect a level shifter circuit, the software must determine that there is an NFET inversion circuit within the confines of the level shifter analysis.

By using both the first PFET oriented and second NFET oriented method, in either order, however, the weaknesses of either method can be circumvented by supplementing the results with the findings from the other method. This is thus sort of a "suspenders and belt" type approach using two complementary techniques.

Examples

Figure 1:
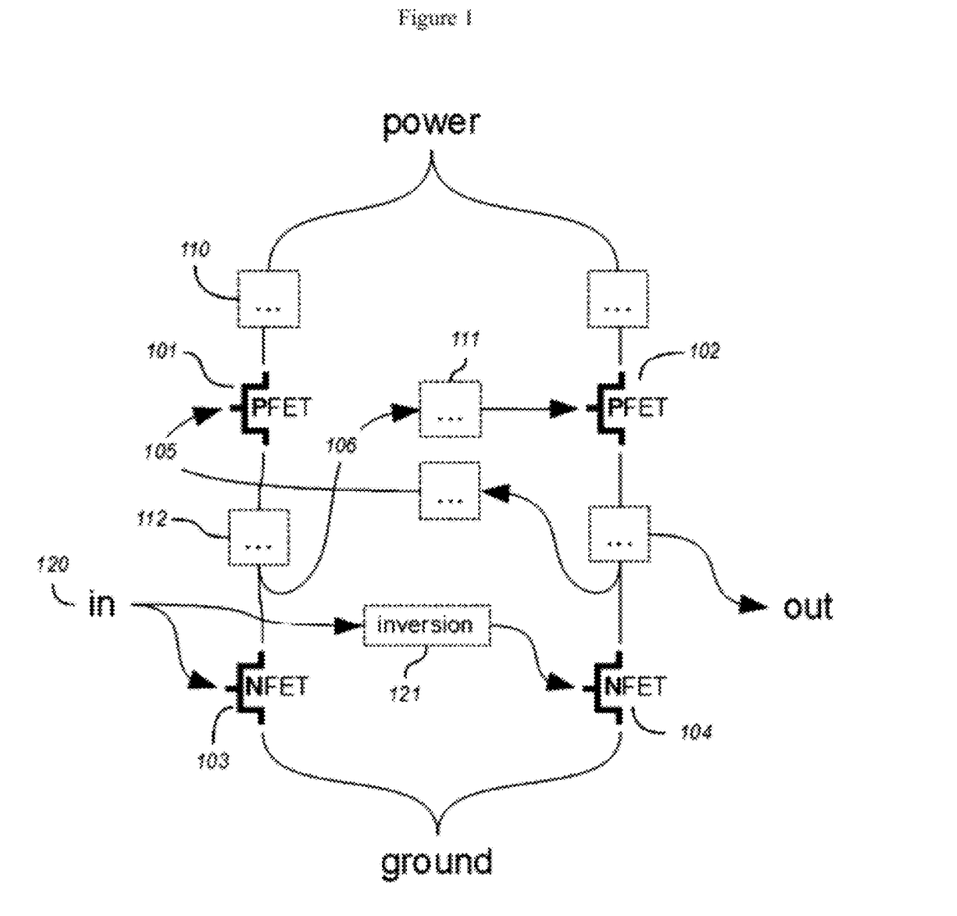
FIG. 1 shows a generalized level shifter diagram.

FIG. 1 shows a generalized example of a level shifter circuit. In this example, the level shifter comprises a pair of PFET devices (101), (102) which are "cross-coupled" to each other through paths (105) and (106). As a result, the output of one PFET device feeds to the gate input of the other PFET device, and vice versa.

The output of PFET (101) may pass through various intermediate devices (e.g. 112), and correspondingly the output of PFET (102) may also pass through intermediate devices. Similarly, the cross-coupled paths (105) and (106) may also either be direct, or alternatively pass through various intermediate devices (111).

This overall PFET arrangement is referred to in this specification as a "cross-coupled" or "bootstrap pair". This type of analysis generates relatively few false positives, because this type of PFET arrangement is almost always confined to a level shifter circuit. Functionally, the purpose of this arrangement is to provide a "toggle on"/"toggle off" function, where the PFET pair essentially takes care of providing its own holding power (i.e. it does not required a powered signal from the outside in order to hold the state). Typically only one of the two PFET devices will be on (conducting) at a time. In operation, the action of turning on one PFET device (such as 101) will then feed through cross-coupling (106) to turn off the other PFET device (102).

The lower part of the level shifter handles an incoming signal (120) from a first power domain, which will be converted to levels that are appropriate to the appropriate second power domain's power supply (power for output PFET (102)). Here NFETs (103) and (104) operate with the input signal (120) and inverted copy (121) on their gates. Thus, NFET (103) will conduct when NFET (104) is off, and vice versa. This mutually exclusive conduction in the NFETs causes a "toggle on"/"toggle off" (or "toggle left"/"toggle right") flip-flopping in the PFETs (101) & (102).

The net effect is to convert digital signals from power levels appropriate for the first power domain to digital signals with power levels appropriate for the second power domain.

Figure 2:
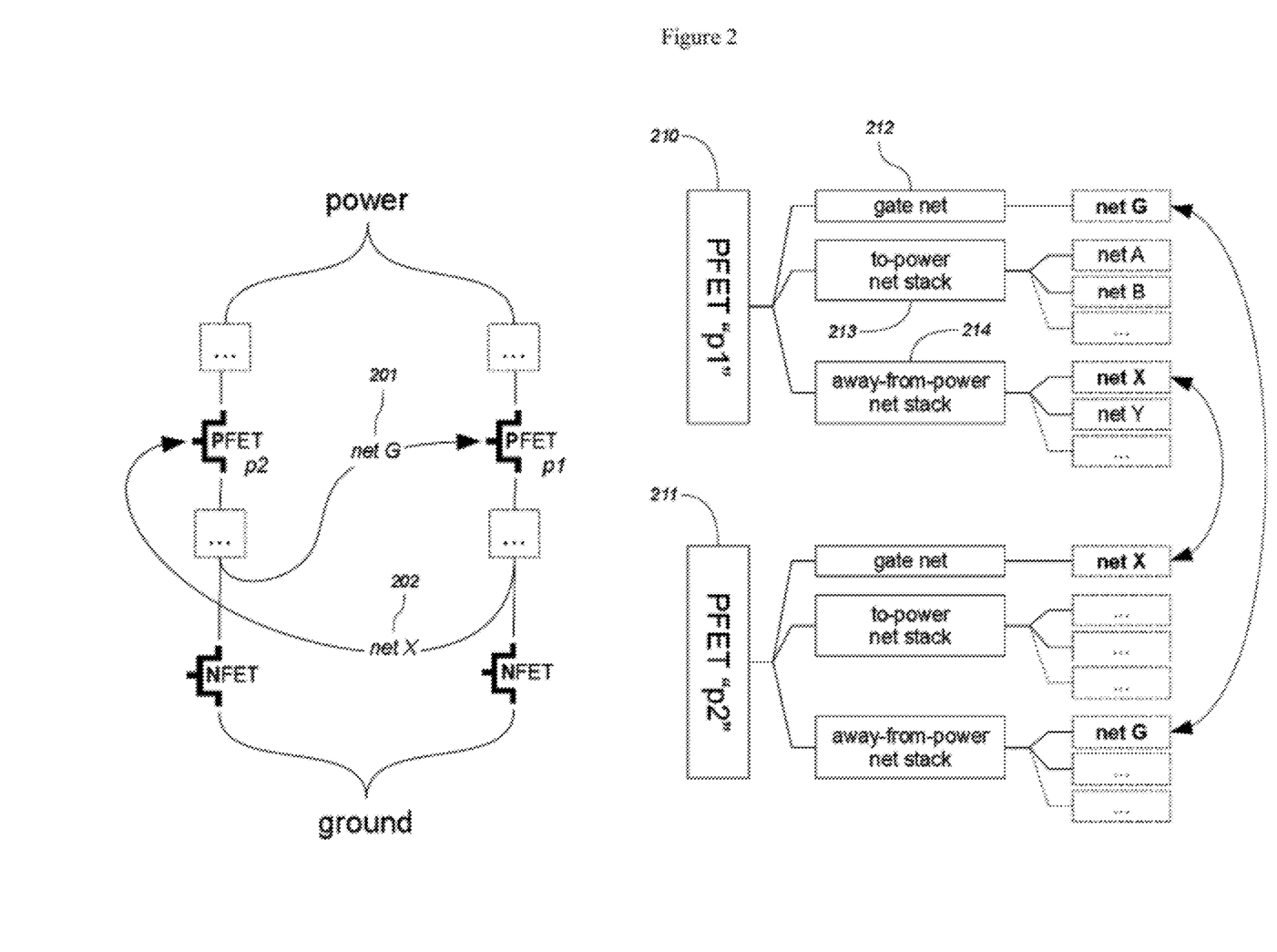
FIG. 2 shows a first mode of the level shifter detection algorithm that starts by detecting cross-coupled PFET devices.

FIG. 2 shows the first level shifter detection method in operation, here using the cross-couple pattern as a starting point for the analysis. As previously discussed, this first method is but one of two complementary level shifting methods. The second level shifter detection method, where the analysis starts with determining an inversion circuit between pairs of NFET devices, will be discussed in FIG. 3.

Note that in some embodiments, the data structure(s) used to analyze PFET devices and NFET devices may be a general purpose FET data structure configured to analyze both PFET and NFET devices. However to better illustrate the concept, in the various figures, generally the PFET or NFET aspects of such a general purpose FET data structure are shown.

In this first method, the software starts the analysis by finding a pair of PFET devices that are connected by mutual, complementary cross-coupling nets (201) and (202). Note that this method tends to require nets (201) and (202) be direct connections, at least when the simplification discussed in the following steps is used. Here this simplification often works, however, because the majority of level shifters fit into a model where, in fact, cross-coupled nets (201) and (202) are directly connected (e.g. they have no other devices or nets in this particular path).

In this example, data structure (210) is built for a single PFET device, which should be interpreted as a data structure in computer memory that is then analyzed by the method's software. This data structure (210) will generally have memory storage locations (or record fields) for other parameters, including the PFET's gate net (212), a sequence of nets that exist between the PFET and its power supply (213), and a sequence of nets that exist beyond the PFET, in the direction away from its power supply (214).

In operation, the software implemented method proceeds by creating a different data structure (such as 210) for each PFET in the circuit. Here the net on the PFET's gate is added to the data structure (at 212), and the net on the PFET drain is added as the first item in a stack (at 213). Then using software recursion methods, subsequent devices are explored (or traced), typically up through a relatively small or limited number of devices (e.g. three devices). Thus, a stack of nets ends up being associated with a particular PFET device (210), where the first net in the stack is the net directly connected to the particular PFET device being analyzed, and further nets in the stack are those further away from that particular PFET device.

To find pairs of PFETs in the circuit where cross-coupling is mutually shared between the two parts of the PFET pair, the data structures (210) and (211) can be further compared by software as follows:

The gate net (212) of one data structure is searched for to determine if it also appears in the other data structure. If this particular gate net is also referenced by the "away-from-power net stack" of the other data structure, then the software can determine that at least one half of the desired cross-coupling has been found. The software can then continue searching further for the complementary other cross-coupling half part of the circuit. That is, the software can test if the gate net of the other data structure is also referenced by the net stack (214) of the first data structure (210).

Figure 3:
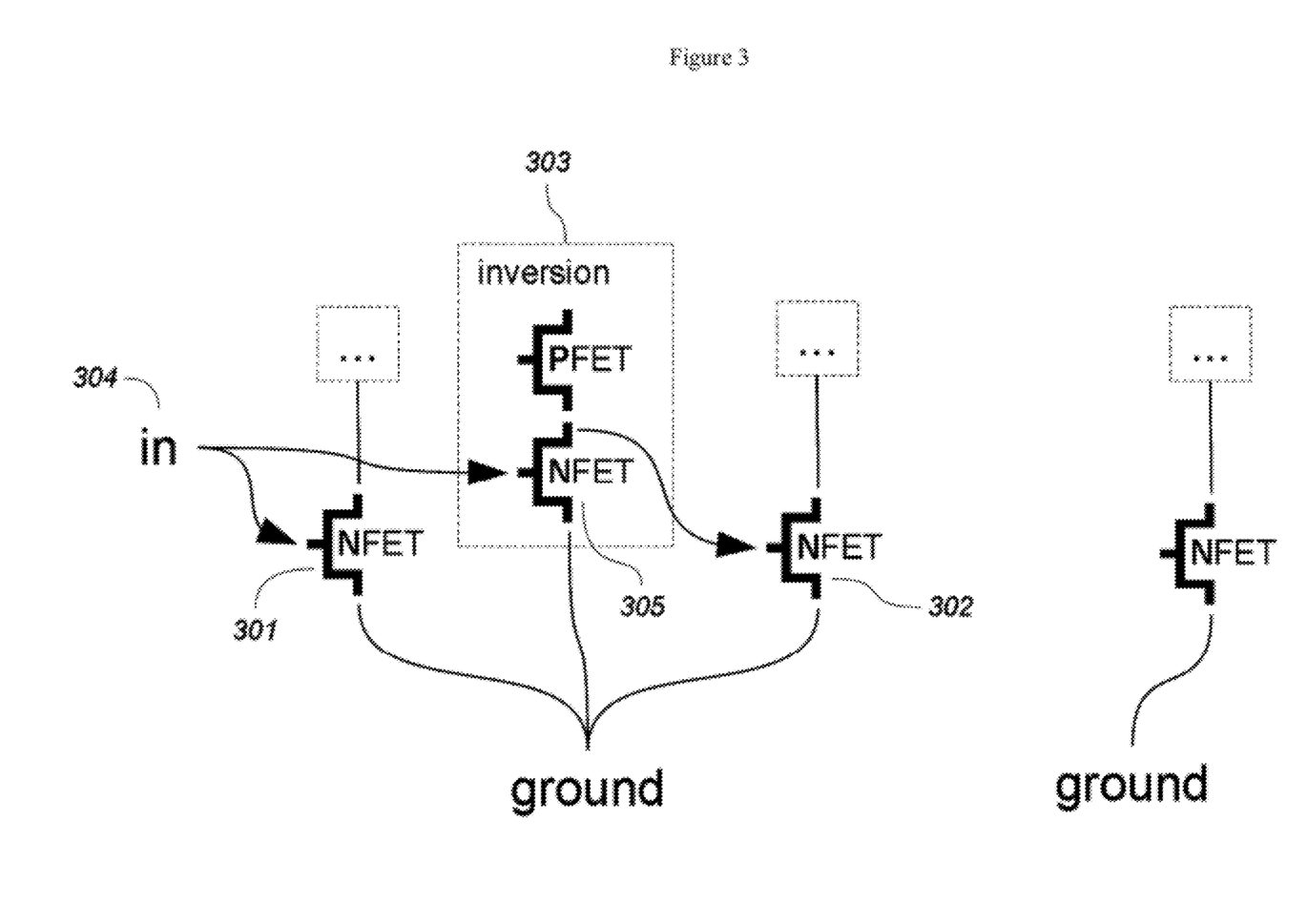
FIG. 3 shows an alternate second mode of the level shifter detection algorithm that starts by detecting ground connected NFET devices that are coupled by a signal inverter.

If both the "gate-to-other" and "other-to-gate" common references are found between the two structures (210) and (211), then the software can determine that the cross-coupling between the two given PFETs of the PFET pair is complete, and this will satisfy one level shifter criteria. FIG. 3 shows the second, NFET oriented, method level shifter detection. Here this second method, which here is based on finding an inversion circuit between two NFET devices as the starting point.

According to this complementary second method of level shifter detection, each NFET in the circuit is checked for its connection to a ground or local ground-type node, where again such grounds may be determined by the methods of parent application Ser. No. 13/401,704, as discussed previously.

Here any such NFET device on the on ground or ground-type net is then compared to other such NFET devices. In this example, NFETs (301) and (302) are being compared.

In this example, the gate net of NFET device (301) is found to be a signal line (304), while the gate net of NFET (302) is found to be the output of an inversion stage (303). Finally, the analysis software finds that the signal (304) is the input to the inversion circuit (303), and thus the software determines that NFETs (301) and (302) are related through an inverter circuit.

Here the stage of inversion is simply an NFET (305) on a ground or ground-type net, with the gate as the input and source/drain as the output. This is suggestive that these NFETs are part of a level shifter, but more tests are needed.

Figure 4:
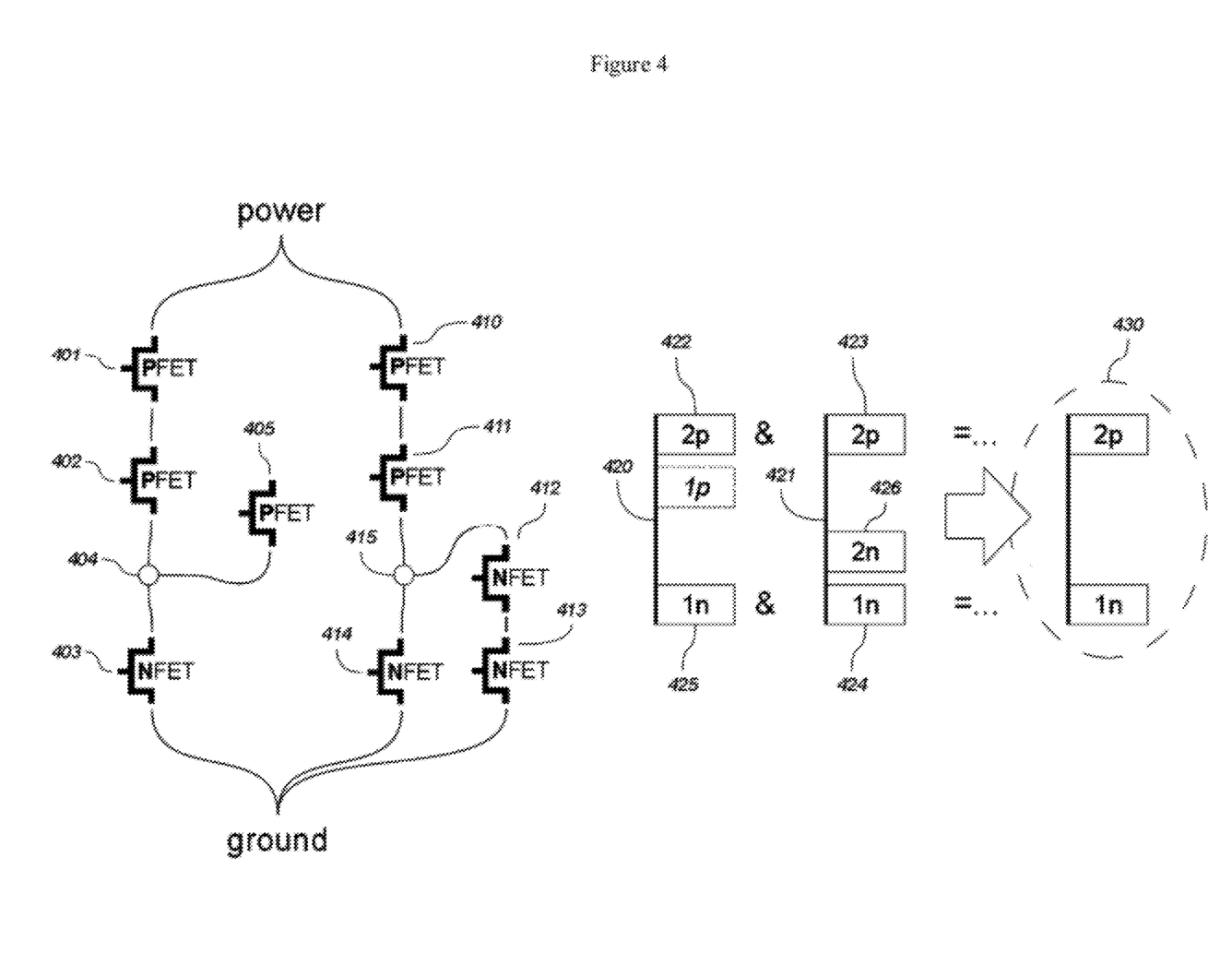
FIG. 4 shows how the invention's level shifter detection software may determine if the two sides or stacks of a candidate level shifter circuit are parallel and complementary.

To continue the analysis further, the various stacks of connected devices must be further analyzed and compared by the software, as is shown in FIG. 4.

In this example, there are two parallel stacks of circuit devices, which are centered on nodes (nets) (404) and (415). These form the two complementary sides of a level shifter (here for brevity shown without inversion and without cross-coupling). The transistors (401), (402), and (403) form the essential parts of one stack, while transistors (410), (411), and (414) form the essential parts of the other stack.

Additional transistors (405), (412), and (413) are also connected to these stacks, but do not form an essential parts of the level shifter circuit per se. Rather, these additional transistors are used to illustrate how the method can discriminate between the essential and non-essential parts of the level shifter stacks, and identify where a true level shifter actually exists.

When acting as a level shifter (i.e. during actual operation), the level shifter circuit will toggle due to the complementary nature of the two stacks. Here transistors (401), (402), and (403) are part of one stack or side, while transistors (410), (411), and (414) form part of the other stack or side. In this example the extraneous transistors (405), (412), and (413) provide other functions. These other functions can include functions such as a possible reset, transition delay, power-off, or other aspects that do not directly affect level shifter's main purpose of shifting levels from input to output.

To determine that these two stacks (at nodes 404 & 415) are both parallel and complementary, the software implemented method creates another data structure (in memory) that is used for stack comparison purposes. This particular data structure (420) holds a "signature" of all the transistors that lead away from the center node (404) of a particular circuit stack. The "signature" of 420 is a shorthand notation way of describing the circuit stacks in abstract, such that important aspects of the stacks can be compared to each other, while allowing unimportant aspects to be ignored. In this case, the signature of 420 indicates the dimensions of the stack (numbers of transistors connected in pathways to power or ground).

Again using software recursion type methods, the software implemented method explores (i.e. traces away) from the center node (404), through various transistors (and generally tolerating or continuing the analysis past resistors if resistors are found in the path) until it finds each path to a power or ground net. Again the power or ground nets may be determined by the methods of Ser. No. 13/401,704, as discussed previously.

In this example, the transistors (402) and (401) form one path to a power net, so the software makes a corresponding entry (422) into the signature structure (420). Similarly, the transistor (403) forms a path to a ground net, so the software makes a corresponding entry (425) into the signature structure (420). However in this example, the transistor (405) does not form a path to a power or ground net, so the software makes no entry made into the signature for (405).

In this example, the signature data structure (421) has a PFET entry (423) for transistors (410) and (411), an NFET entry (426) for transistors, and NFET entry (424) for transistor (414).

In this example, the software determines that signature data structures (420) and (421) have a virtual "midpoint" which splits the PFET devices apart from NFET devices. Here signatures (420) and (421) are compared to each other, and the software determines that that the PFET entries (422) and (423) match each other, and also NFET entries (425) and (424) match each other. This meets the criteria that these entries survive in a final matched signature, which is a product of both input signatures, here shown as signature (430).

By contrast, the software determines that NFET entry (426) does not have a matching entry in signature (420), so NFET device (426) is thrown out (i.e. is not analyzed further) and this device does not carry forward into the signature product (430).

After the software produces signature (430) from the common entries from (420) and (421), the software can then determine that (430) "survives". That is (430) has both a PFET entry and an NFET entry.

Given that the software has determined that (430) has survived the analysis process, the software can then thus further determine that the circuit stacks are compatible and parallel. That is, they have similar structures and they extend between power and ground in the same way. (By contrast, if either the PFET or NFET side of (430) were empty, then (430) would not survive the analysis, and the software would determine that the two circuit stacks (404) and (415) are thus incompatible.) However since in this case, signature structure (430) has survived the analysis, the likelihood that this is part of a level shifter circuit is now further enhanced. However there is still one more check to go—are the two parallel stacks also cross-coupled?

Figure 5:
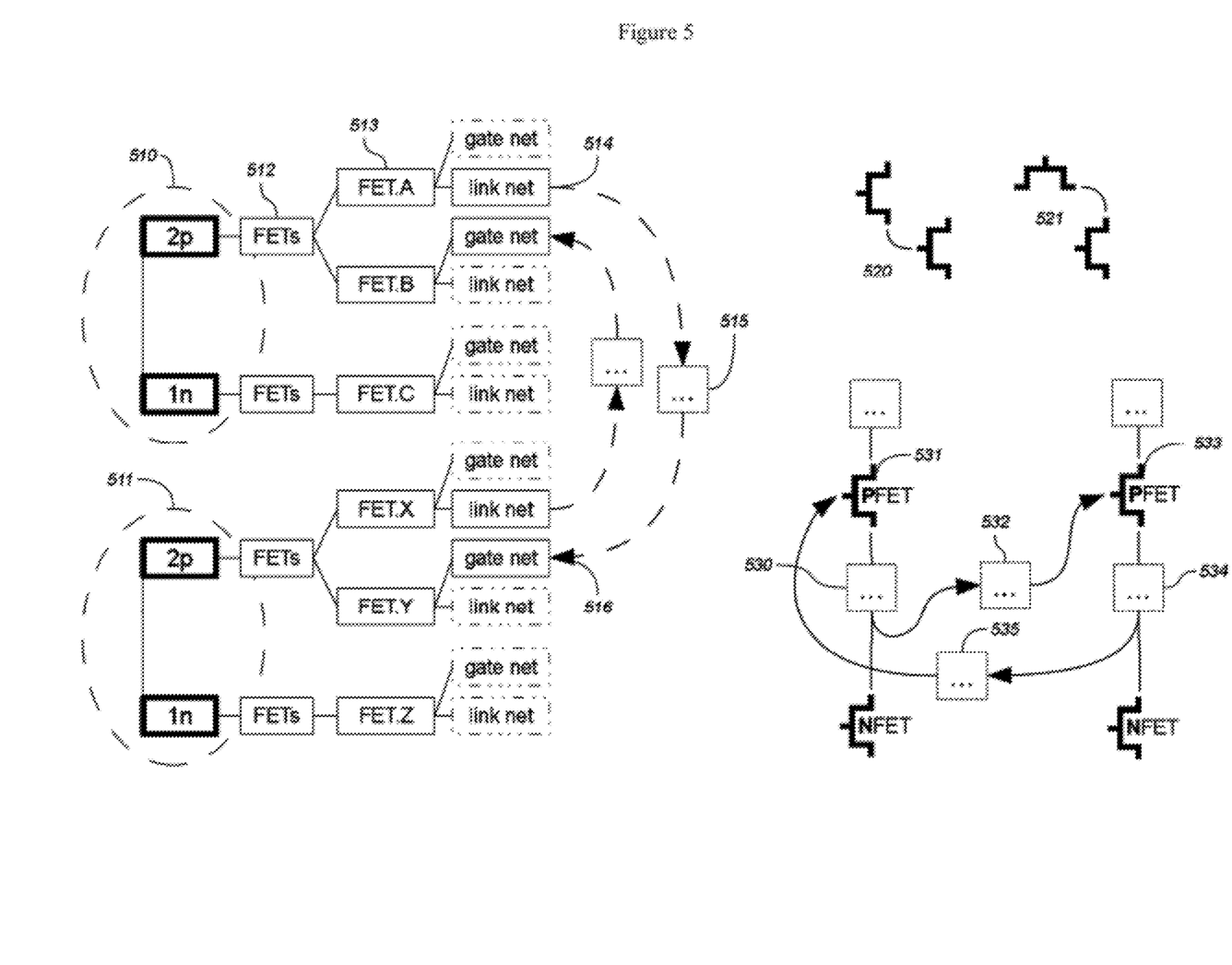
FIG. 5 shows how the invention's level shifter detection software may determine if the two parallel sides or stacks of a candidate level shifter circuit are also cross-coupled.

FIG. 5: Finding Cross-Coupling Between Two Parallel Stacks

As previously discussed, to further verify that a potential circuit of interest is a level shifter, the software must also determine that the two parallel stacks, previously defined above, are also cross coupled. To do this, the signature memory structure previously shown in FIG. 4 may be further expanded to hold more data, here exemplified by (510) and (511).

In this example, the software fills in the signature entry for the PFET devices with a list of specific transistors (512), thus containing devices such as (513). In this example, transistor (513) has specific net connections such as (514). Thus, as a result, once the software has made the appropriate assignment, signature (510) will now point to the lookup records for all the transistors and net connections pertaining to the original circuit stack from which the signature was derived.

Thus signature structure (510) is an expansion of the simplified structure previously seen in FIG. 4 as (420), and signature structure (511) is an expansion of the simplified structure previously seen in FIG. 4 as (421).

Again through a process of software recursion, the software then analyzes, explores, or traces the circuit from a specific starting point net, such as (514), or any other net as needed during this phase. This software implemented recursive exploration method can be programmed to continue the analysis (e.g. push through) past a single device (transistor or resistor) in the circuit, arrive at the other side of the single device, and then continue the analysis and tracing through a following device. For example, as exemplified by (520), this recursive sequence can go from FET output to FET input (here following the path of a signal). As exemplified by (521), this sequence can also go through a chain of FETs or resistors (here following a DC path).

In this example, when exploring from net (514), the software may find that there is some signal or DC path, through optional intermediate devices (515), to net (516). This software traced path here corresponds to the path in the actual circuit from optional devices (530) and optional devices (532), to the gate of PFET (533) (gate net 516).

Similarly, the software may determine that an actual circuit path is found in the reverse, complementary direction, such as from optional devices (534), through optional devices (535), to the gate of PFET (531).

Having completed these two complementary paths, between the specific nets held in the signature structures (510) and (511), the software can then determine that the two circuit stacks are, in fact, cross-coupled sufficiently to form a level shifter. The software can then record this fact in memory for future use.

As previously discussed, in some embodiments, once the level shifters have been determined, it is then useful to use this finding in conjunction with the teaching of parent application Ser. No. 13/451,530 to then put this level shifter information into the broader power domain context for the particular complex integrated circuit being analyzed.

For example, the power domain classification methods of Ser. No. 13/451,530 (together with the power and ground net methods of Ser. No. 13/401,704 as needed) can be combined with the automated level shifter determination methods of the present method to provide an overall graphical output showing, at a glance, the various major power domains in an integrated circuit design, as well as if the signal lines connecting these various major power domains are, or are not, adequately protected by appropriate level shifters.

In FIG. 6, which is based in part on corresponding FIG. 6 from Ser. No. 13/451,530 (incorporated herein by reference), the power domain methods of Ser. No. 13/451,530 have completed the bottom-up nested block opening and analysis process of power domain analysis, the software now is now providing high level root cause of failure analysis to the circuit designers. Here this high level root cause of failure analysis is shown a graphical form.

As per Ser. No. 13/451,530, FIG. 6, again assume that the integrated circuit chip was comprised of the following high level blocks and power domains:

At the highest (top) level, the original circuit can be viewed as almost a circuit "black box" (601) with two power nets (602) and (603) entering at the top. At this top level, no other information is exposed.

After further processing according to the software implemented power domain analysis methods of Ser. No. 13/451, 530 and then going to the next level of detail, original circuit (601) is now represented at the next level of complexity, and this next level (610) is both interesting and useful to the circuit designer.

At the (610) level of detail, integrated circuit (601) has been found to contain a high level but unopened block or cell (611). Block or cell (611) is unopened (i.e. not examined further internally) because the analysis software, according to the previously discussed rules above, determined that it was unlikely that both block (611), and the many nested blocks that were children and grandchildren of (611), were unlikely to have power issues. Because (611) was unopened and does not have any visible child bocks or nested blocks, it is drawn on FIG. 610) as a leaf or lowest level block in the hierarchy. The name of block (611), which the system software can also determine by netlist inspection is shown as label (612).

Similarly the other unopened blocks, such as (632), (631), and (630) are also drawn as lowest level of "leaf" blocks, even though in actuality they may be complex hierarchical structures of various blocks and sub-blocks.

Using Ser. No. 13/451,530's previously discussed automated power analysis and power net merging operations, the software has also found a power net (613) that connects in common to blocks (611) and (632), and the software has rendered the corresponding FIG. 6 graphic as such. The software also found a different power net (615) that connected blocks (630), (632), and switch device (616), as well as a power net continuing on the other side of switch device (616) and connecting it with block (631). Here again, the software has also extracted various labels (such as 614) from the netlist and affixed them to the appropriate power nets and blocks as described previously.

As previously discussed in Ser. No. 13/451,530, in addition to showing power nets between blocks, the software may also be set to show other types of types of signal carrying interconnections as well. Showing such non-power signal connections can be useful, particularly if the connections extend between different power domains, because if these signal carrying interfaces do not have adequate protection. Here for example, the methods of the current disclosure may be used to determine if these signal carrying interconnections are adequately protected by level shifters.

In this example, the software has determined that a plurality of non-power signal interface nets or paths (621) extend between leaf blocks (611) & (630). Here the software can be set to not show such paths if it determines that the number paths is small (i.e. below a preset coefficient), and/or if it determines that the paths between two different power domains are adequately protected (by some other preset criteria). However, if, according to the methods of the present disclosure, if the software determines that such paths are not adequately protected by level shifters, then (as one example) these non-level shifter protected signal pathways between different power domains may be displayed on the overview graph, as they are in FIG. 6 (640) "!lshft". The software may be set so that even a single signal carrying path between different power domains may be displayed if there is a corresponding error, such as a lack of an appropriate level shifter, to show along with it.

The invention claimed is:

1. A method of automatically identifying level shifter circuits in a specification of a netlist of a circuit of a complex integrated circuit chip comprising a plurality of nets, said method comprising:
obtaining a representation of said netlist in a computer readable form;
using at least one computer processor, software, and memory to analyze said nets from said netlist, and for each analyzed net:
determining at least one pair of directly cross-coupled PFET devices, and for each one pair of said directly cross-coupled PFET devices:
using two netlist locations of said one pair of directly cross-coupled PFET devices as two PFET starting locations, tracing those nets that are coupled to each of said one pair of directly cross-coupled PFET devices and are also ultimately coupled to ground nets by way of intermediate NFET devices, thus determining two PFET to NFET to ground pathways (stacks);
determining if said two PFET to NFET to ground pathways (stacks) are also cross-coupled and parallel: and
if said two PFET to NFET to ground pathways (stacks) are also cross-coupled and parallel, then determining that said one pair of directly cross-coupled PFET devices and two PFET to NFET to ground pathways (stacks) are formed as a level shifter, thus making a level shifter determination; and
storing said level shifter determination in said memory as a first level shifter determination.

2. The method of claim 1, further using said level shifter determination to identify at least some of said PFET devices and NFET devices as components of a level shifter circuit.

3. The method of claim 2, further linking at least some of said PFET devices and NFET devices together and identifying at least some of said linked PFET and NFET devices as components of a level shifter circuit so that at least some of said PFET devices and NFET devices can then be identified as being a part of the same level shifter circuit.

4. The method of claim 1, further using said computer processor, software, and memory to create a plurality of FET data structures;
wherein said plurality of FET data structures are configured to allow a unique PFET data structure to be assigned to each PFET device being analyzed;
wherein said PFET to NFET to ground pathways are represented as a stack of PFET to NFET to ground nets;
wherein PFET to power net pathways are represented as a stack of PFET to power nets;
said FET data structures comprising data fields for storing PFET device identifier, said stack of PFET to NFET to ground nets, and said stack of PFET to power nets; and
using said FET data structures to determine cross-coupling between different PFET devices.

5. The method of claim 4, further using said PFET data structure to recursively trace net connections outward from said PFET devices.

6. The method of claim 1, wherein only pairs of PFETs determined to be both served by a power supply and determined to be of a same device type or model name are analyzed.

7. The method of claim 1, further automatically identifying, without requiring a-priori knowledge of which of said nets are power or ground nets, those nets that are statistically likely to be power or ground nets, said method comprising:
obtaining a representation of said netlist in a computer readable form;
using at least one computer processor, software, and memory to analyze said nets from said netlist, and for each analyzed net:
a) determining electrical properties of each device or device terminal that is coupled to said analyzed net, and sorting said electrical properties for each device or device terminal into a series of bins, thereby creating a mathematical description of overall electrical properties of the various devices that are coupled to said analyzed net; and b) comparing said mathematical description with at least one preset mathematical description of a power net or a ground net;

and if said mathematical description falls within said at least one preset mathematical description of a power net or a ground net, then at least provisionally determining that said analyzed net is a power net or a ground net, and storing results of said provisionally determining in said memory for later use for the level shifter determination.

8. The method of claim 7, wherein said specification of the netlist of the circuit of the integrated circuit chip further comprises a nested block hierarchy structure of various devices, an overall adequacy of the circuit's electrical power distribution and power protection schemes, said method further comprising:

using at least one processor and software to determine which nets are power supply nets; determining a connectivity of said power supply nets to different types of power supplies; automatically traversing the nested block hierarchy structure of the circuit, ascending and descending in the nested block hierarchy structure, and automatically determining if each examined block has an adequate power coverage, and if any of interfaces to other blocks are problematic due to differing power supplies between blocks; and reporting or storing in memory at least some cases where said blocks have inadequate power coverage or if any of the interfaces to other blocks are problematic due to differing power supplies between blocks and no suitable level shifter(s) in said interfaces are detected.

9. The method of claim 1, further determining at least one pair of common inverter cross-coupled NFET devices that are also ultimately coupled to ground nets, and for each pair of said common inverter cross-coupled NFET devices that are also ultimately coupled to ground nets:

using two netlist locations of said one pair of NFET devices as two NFET starting locations, tracing those nets coupled to each of said one pair of common inverter cross-coupled NFET devices, that are also ultimately coupled to power nets by way of intermediate PFET devices, thus determining two NFET to PFET to power pathways (stacks);

determining if said two NFET to PFET to power pathways (stacks) are also either directly, indirectly, or distantly cross-coupled and parallel;

if said two NFET to PFET to power pathways (stacks) are also either directly, indirectly, or distantly cross-coupled and parallel, then determining that said two NFET devices and two NFET to PFET to power pathways are formed as a level shifter, thus making a level shifter determination; and storing said level shifter determination in memory as a second level shifter determination.

10. A method of automatically identifying level shifter circuits in a specification of a netlist of a circuit of a complex integrated circuit chip comprising a plurality of nets, said method comprising:

obtaining a representation of said netlist in a computer readable form;

using at least one computer processor, software, and memory to analyze said nets from said netlist, and for each analyzed net:

determining at least one pair of common inverter cross-coupled NFET devices that are ultimately coupled to ground nets, and for each one pair of said common inverter cross-coupled NFET devices that are also ultimately coupled to ground nets:

using two netlist locations of said one pair of NFET devices as two NFET starting locations, tracing those nets coupled to each of said one pair of common inverter cross-coupled NFET devices, that are also ultimately coupled to power nets by way of intermediate PFET devices, thus determining two NFET to PFET to power pathways (stacks);

determining if said two NFET to PFET to power pathways (stacks) are also either directly, indirectly, or distantly cross-coupled and parallel; and if said two NFET to PFET to power pathways (stacks) are also either directly, indirectly, or distantly cross-coupled and parallel, then determining that said two NFET devices and two NFET to PFET to power pathways are formed as a level shifter, thus making a level shifter determination; and storing said level shifter determination in said memory as a second level shifter determination.

11. The method of claim 10, further using said level shifter determination to identify at least some of said PFET devices and NFET devices as components of a level shifter circuit.

12. The method of claim 11, further linking at least some of said PFET devices and NFET devices together and identifying at least some of said linked PFET and NFET devices as components of a level shifter circuit so that at least some of said PFET devices and NFET devices can then be identified as being part of a same level shifter circuit.

13. The method of claim 10, further using said computer processor, software, and memory to create a plurality of FET data structures;

wherein said plurality of FET data structures are configured to allow a unique NFET data structure to be assigned to each NFET device being analyzed;

wherein said NFET to PFET to power pathways are represented as a stack of NFET to PFET to power nets;

wherein NFET to ground power pathways are represented as a stack of NFET to ground nets;

wherein NFET to inverter pathways are represented as a stack of NFET to inverter nets;

said FET data structures comprising data fields for storing NFET device identifier and gate net location, said stack of NFET to PFET to power nets; said stack of NFET to ground nets, and said stack of NFET to inverter nets; and using said FET data structures to determine direct, indirect, or distant cross-coupling between different NFET devices.

14. The method of claim 13, further using said PFET data structure to recursively trace net connections outward from said PFET devices.

15. The method of claim 13, further testing for parallelism between the NFET to PFET to power nets for each said pair of NFET devices by generating signature data structures of all transistors that lead away from center node of said stack of NFET to PFET to power nets, (circuit stack), recursively determining paths to power or ground nets, and determining if said signature data structures have comparable PFET and NFET entries.

16. The method of claim 10, wherein only pairs of NFETS determined to be both served by a power supply, determined to be of a same device type or model name, and determined to be directly connected to a ground net are analyzed.

17. The method of claim 10, further automatically identifying, without requiring a-priori knowledge of which of said nets are power or ground nets, those nets that are statistically likely to be power or ground nets, said method comprising:

obtaining a representation of said netlist in computer readable form;

using at least one computer processor, software, and memory to analyze said nets from said netlist, and for each analyzed net:

a) determining electrical properties of each device or device terminal that is coupled to said analyzed net, and sorting said electrical properties for each device or device terminal into a series of bins, thereby creating a mathematical description of an overall electrical properties of various devices that are coupled to said analyzed net; and b) comparing said mathematical description with at least one preset mathematical description of a power net or a ground net;

if said mathematical description falls within said at least one preset mathematical description of a power net or a ground net, then at least provisionally determining that said analyzed net is a power net or a ground net, and storing results of said provisionally determining in memory for later use for the level shifter determination.

18. The method of claim 17, wherein said specification of the netlist of the circuit of the integrated circuit chip further comprises a nested block hierarchy structure of various devices, an overall adequacy of the circuit's electrical power distribution and power protection schemes, said method further comprising:

using at least one processor and software to determine which nets are power supply nets; determining a connectivity of said power supply nets to different types of power supplies; automatically traversing the nested block hierarchy structure of the circuit, ascending and descending in the nested block hierarchy structure, and automatically determining if each examined block has an adequate power coverage, and if any of interfaces to other blocks are problematic due to differing power supplies between blocks; and reporting or storing in memory at least some cases where said blocks have an inadequate power coverage or if any of the interfaces to other blocks are problematic due to differing power supplies between blocks and no suitable level shifter(s) in said interfaces are detected.

19. The method of claim 10, further determining at least one pair of directly cross-coupled PFET devices, and for each pair of said directly cross-coupled PFET devices:

using the two netlist locations of said one pair of directly cross-coupled PFET devices as two PFET starting locations, tracing those nets coupled to each of said one pair of directly cross-coupled PFET devices, that are also ultimately coupled to ground nets by way of intermediate NFET devices, thus determining two PFET to NFET to ground pathways (stacks);

determining if said two PFET to NFET to ground pathways (stacks) are also cross-coupled and parallel:

if said two PFET to NFET to ground pathways (stacks) are also cross-coupled and parallel, then determining that said two PFET devices and two PFET to NFET to ground pathways (stacks) are formed as a level shifter, thus making a level shifter determination; and storing said level shifter determination in said memory.

20. A method of automatically identifying level shifter circuits in a specification of a netlist of a circuit of a complex integrated circuit chip comprising a plurality of nets, said method comprising:

representing said netlist in a computer readable form;

using at least one computer processor, software, and memory to analyze said nets from said netlist, and for each analyzed net:

determining at least one pair of directly cross-coupled PFET devices, and for each one pair of said directly cross-coupled PFET devices:

using two netlist locations of said one pair of directly cross-coupled PFET devices as two PFET starting locations, tracing those nets coupled to each of said one pair of directly cross-coupled PFET devices, that are also ultimately coupled to ground nets by way of intermediate NFET devices, thus determining two PFET to NFET to ground pathways (stacks);

determining if said two PFET to NFET to ground pathways (stacks) are also cross-coupled and parallel: and if said two PFET to NFET to ground pathways (stacks) are also cross-coupled and parallel, then determining that said two PFET devices and two PFET to NFET to ground pathways (stacks) are formed as a level shifter, thus making a level shifter determination; and storing said level shifter determination in said memory as a first level shifter determination;

further determining at least one pair of common inverter cross-coupled NFET devices that are also ultimately coupled to ground nets, and for each one pair of said common inverter cross-coupled NFET devices that are also ultimately coupled to ground nets:

using two netlist locations of said one pair of NFET devices as two NFET starting locations, tracing those nets coupled to each of said one pair of common inverter cross-coupled NFET devices, that are also ultimately coupled to power nets by way of intermediate PFET devices, thus determining two NFET to PFET to power pathways (stacks);

determining if said two NFET to PFET to power pathways (stacks) are also either directly, indirectly, or distantly cross-coupled and parallel;

if said two NFET to PFET to power pathways (stacks) are also either directly, indirectly, or distantly cross-coupled and parallel, then determining that said two NFET devices and two NFET to PFET to power pathways are formed as a level shifter, thus making a level shifter determination; and storing said level shifter determination in said memory as a second level shifter determination.

21. The method of claim 20, further automatically identifying, without requiring a-priori knowledge of which of said nets are power or ground nets, those nets that are statistically likely to be power or ground nets, said method comprising:

obtaining a representation of said netlist in a computer readable form;

using at least one computer processor, software, and memory to analyze said nets from said netlist, and for each analyzed net:

a) determining electrical properties of each device or device terminal that is coupled to said analyzed net, and sorting said electrical properties for each device or device terminal into a series of bins, thereby creating a mathematical description of overall electrical properties of various devices that are coupled to said analyzed net; and b) comparing said mathematical description with at least one preset mathematical description of a power net or a ground net;

if said mathematical description falls within said at least one preset mathematical description of a power net or a ground net, then at least provisionally determining that said analyzed net is a power net or a ground net, and storing results of said provisionally determining in said memory for later use for the level shifter determination.

22. The method of claim 21, wherein said specification of the netlist of the circuit of the integrated circuit chip further comprises a nested block hierarchy structure of various devices, an overall adequacy of the circuit's electrical power distribution and power protection schemes, said method further comprising:

using at least one processor and software to determine which nets are power supply nets; determining a connectivity of said power supply nets to different types of power supplies; automatically traversing the nested block hierarchy structure of the circuit, ascending and descending in the nested block hierarchy structure, and automatically determining if each examined block has an adequate power coverage, and if any of interfaces to other blocks are problematic due to differing power supplies between blocks; and reporting or storing in said memory at least some cases where said blocks have an inadequate power coverage or if any of the interfaces to other blocks are problematic due to differing power supplies between blocks and no suitable level shifter(s) in said interfaces are detected.

* * * * *